United States Patent [19]

Kung et al.

[11] Patent Number: 5,223,831
[45] Date of Patent: Jun. 29, 1993

[54] IDEOGRAPHICAL CHARACTER SIGNALLING SYSTEM

[75] Inventors: Patrick S. Kung, West Palm Beach; John Schwendeman, Pompano Beach, both of Fla.

[73] Assignee: Motorola, Inc., Schaumburg, Ill.

[21] Appl. No.: 734,080

[22] Filed: Jul. 22, 1991

Related U.S. Application Data

[63] Continuation of Ser. No. 393,357, Aug. 14, 1989, abandoned.

[51] Int. Cl.[5] .......................... H04Q 7/00; G09G 5/24
[52] U.S. Cl. ............................... 340/825.44; 340/715; 340/311.1; 371/31
[58] Field of Search ............ 340/715, 732, 735, 311.1, 340/825.44; 341/28; 371/29.1, 31, 37.1, 37.2, 37.7, 53, 57.1, 67.1, 69.1; 370/93

[56] References Cited

U.S. PATENT DOCUMENTS

| | | | |
|---|---|---|---|
| 4,369,443 | 1/1983 | Giallanza et al. | 340/825.44 |
| 4,704,608 | 11/1987 | Sato et al. | 340/825.44 |
| 4,713,808 | 12/1987 | Gaskill et al. | 370/93 |
| 4,759,022 | 7/1988 | Akerberg | 371/69.1 |
| 4,766,434 | 8/1988 | Matai et al. | 340/825.44 |
| 4,768,031 | 8/1988 | Mori et al. | 340/825.44 |
| 4,779,091 | 10/1988 | Oyagi et al. | 340/825.44 |
| 4,783,654 | 11/1988 | Ichikawa | 340/825.44 |
| 4,851,829 | 7/1989 | DeLuca et al. | 340/825.44 |
| 4,855,731 | 8/1989 | Yoshizawa et al. | 340/825.44 |
| 4,873,519 | 10/1989 | Matai et al. | 340/825.44 |

Primary Examiner—Richard H. Hjerpe
Attorney, Agent, or Firm—Keith A. Chanroo; William E. Koch; Thomas G. Berry

[57] ABSTRACT

This invention relates to an ideographical character signalling system, such as an ideographical character paging system, comprising: input means for inputting a plurality of first and second different types of ideographical characters, said input means including coding means for coding both said first and second types of ideographical characters according to a first code; signal processing means for receiving a data signal comprising said first and second types of ideographical characters coded according to said first code, said signal processing means comprising code converting means for selectively coding the coded first type of ideographical characters according to a second standard code. A signal receiver, for receiving data signals comprising a plurality of coded ideographical characters, and having character generating means for generating for display only the most frequently used ideographical characters together with a special character symbol if a rarely used character is received, is also disclosed.

7 Claims, 6 Drawing Sheets

IDEOGRAPHICAL CHARACTER SIGNALLING SYSTEM

This is a continuation of application Ser. No. 07/393,357, filed Aug. 14, 1989, now abandoned.

FIELD OF THE INVENTION

This invention relates to an ideographical character signalling system and more particularly to an ideographical character paging system.

BACKGROUND OF THE INVENTION

In countries having languages comprising ideographical characters such as China, Japan, Taiwan, paging systems which can transmit, receive and display the ideographical characters are required. Such paging systems are well known: however, several problems have arisen in the development of these ideographical paging systems.

Typically a ideographical paging system comprises a character entry device, a terminal for control and coding functions and display pagers. Each one of a predetermined selection of characters of the language has an associated code, comprising one or more bytes, according to an industrial coding standard. A display pager on receiving a signal having a number of coded bytes decodes the signal according to the industrial code used, reads the corresponding characters from its character generating memory and displays the characters. However, the standard codes used to code the characters vary from one country to another. For example, the standard code in Taiwan is different to the standard code in China. Also, in some cases, there are multiple coding standards within the same country. Therefore, for each of the coding standards different pager models in the paging system are required to be used, even when the same character set has been coded. This makes the ideographical paging system increasingly expensive.

The Japan Industrial Standard (JIS), Peoples Republic of China (PRC), and Taiwan industrial coding standards have been developed to cover a particularly large number of characters. However, in order to code each one of these characters approximately 7000 words are needed which require two-mega-bits (2M bits) of Read Only Memory (ROM) for formatting. As a result excessive memory space is needed to incorporate all these characters into the character generating ROM of the pager.

Another problem associated with an ideographical paging system arises due to the incompatibility of the character sets which can be entered into the entry device, processed in the terminal and displayed in the display pager: this is a direct result of the memory capacity limitation of the terminal and character generating ROM of the pager. Since it is not practical to incorporate all the characters of the language into the system, especially into the memory of the character generating ROM, only a selection of characters are incorporated into the system. The number of characters incorporated depends on the memory capacity, therefore the selection can vary between the entry device with a larger capacity, the terminal and the character generating ROM.

Thus, a problem occurs when a rarely used character is entered via the entry device into the system and the entered character is not one of the predetermined selection of characters stored in the character generating ROM of the pager (such a character will be referred to as an 'illegal' character hereafter). When the pager receives an 'illegal' character, irrespective of whether the following characters are 'illegal' or not, the data decoding is interrupted and no further characters will be displayed. Since the same result occurs when the pager or the system malfunctions, the user of the pager has no information as to why the displayed message is incomplete.

Thus, it is an object of the present invention to provide an improved ideographical signalling system wherein the above problems are overcome.

SUMMARY OF THE INVENTION

In accordance with a first aspect of the present invention there is provided an ideographical character signalling system comprising:

input means for inputting a plurality of first and second different types of ideographical characters, said input means including coding means for coding both said first and second types of ideographical characters according to a first code;

signal processing means for receiving a data signal comprising said first and second types of ideographical characters coded according to said first code, said signal processing means comprising code converting means for selectively coding the coded first type of ideographical characters according to a second standard code.

In accordance with a second aspect of the present invention there is provided a signal receiver for use within an ideographical character signalling system for receiving data signals comprising a plurality of coded ideographical characters, each one of said ideographical characters being one of a first or second different type of ideographical character, said first type of ideographical character being coded according to a second standard code and said second type of ideographical character being coded according to a first code, said signal receiver comprising:

decoding means for decoding each one of the plurality of coded ideographical characters;

character generating means for generating said first type of characters for display;

control means for determining the type of each one of said plurality of ideographical characters, said control means in response to said first type of ideographical character selecting said first type of ideographical character from the character generating means and said control means in response to said second type of ideographical character providing a special character symbol; and display means for displaying the selected ideographical characters and special character symbols.

Thus, it will be appreciated that since the signal processing means of a ideographical character signalling system covering one area, for example Taiwan, changes the coding of the data signal from a first code (i.e. the standard code for the Taiwan area) to a predetermined second standard code which is the same for all the different areas, one signal receiver can be used within all the areas despite the fact they all have different industrial coding standards.

In a preferred embodiment, the pager comprises a character generating ROM in which only the most frequently used characters of the ideographical language are incorporated. Such characters are referred to as 'legal' characters hereafter. Thus, by reducing the number of characters which can be selected according to the second standard code, the size of the ROM in the pager can be reduced which in turn provides for a substantial reduction in cost.

It will also be appreciated that since the second aspect of the present invention provides means to display a special 'illegal' character symbol when the pager receives an 'illegal' character, the data decoding will not be interrupted on receipt of an 'illegal' character thereby enabling all the characters of a message to be displayed.

BRIEF DESCRIPTION OF THE DRAWINGS

A preferred embodiment of present invention will now be described, by way of example only, with reference to the accompanying drawings.

DETAILED DESCRIPTION OF THE DRAWINGS

Figure 1:
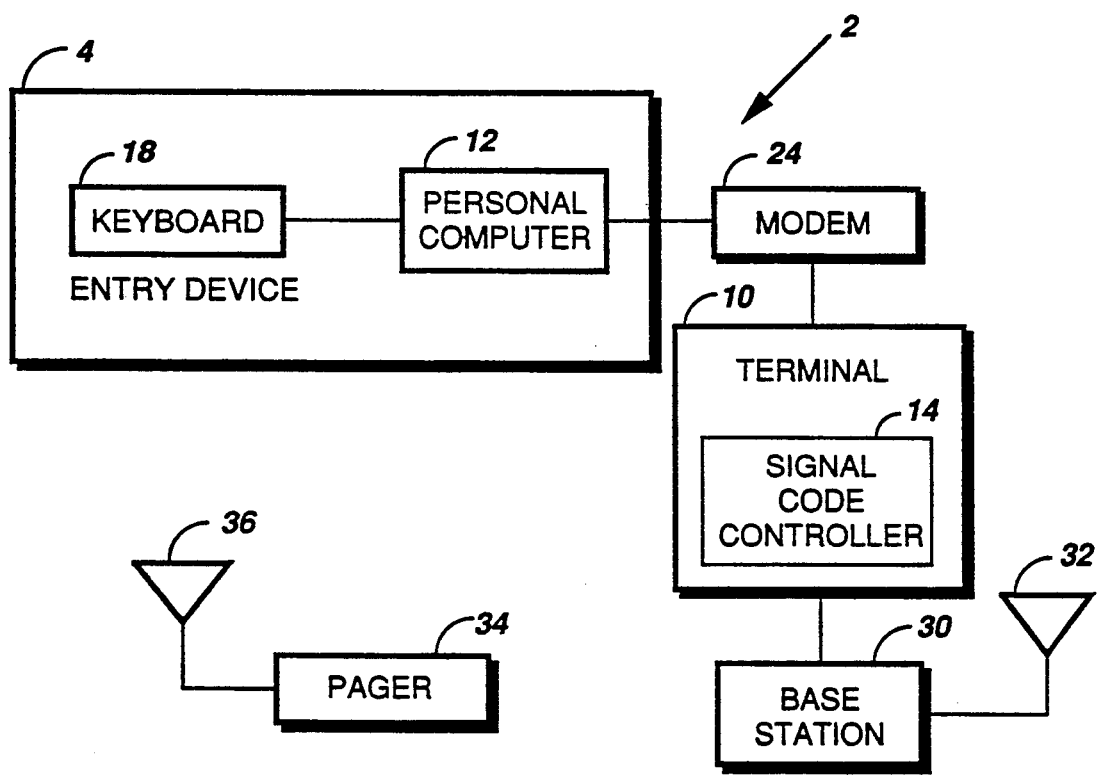
FIG. 1 shows a schematic diagram of the ideographical character paging system in accordance with the present invention.

Referring firstly to FIG. 1, in a preferred embodiment the ideographical character paging system 2 comprises an entry device 4 coupled to a terminal 10. The entry device 4 may be, for example, a personal computer (PC) 12 having a keyboard 18 for keying in the characters of a particular ideographical language.

Once a character has been keyed-in, the PC will select a code for the character from its memory (not shown) according to the particular coding standard which is used. The selected code may be one or two bytes. The coding standard used depends on the area covered by the ideographical character paging system and varies from area to area. The Chinese character 打字 has, for example, according to the JIS coding standard an associated code of 3221 (HEX).

The PC 12 communicates with the terminal 10 via a MODEM 24.

The terminal 10 comprises a signal code controller 14 which contains an address conversion table (not shown). The address conversion table converts the coded words into addresses according to a universal standard code M. Different address conversion tables are implemented for the various coding standards of the different areas and are arranged so that irrespective of the coding of the coded words the resulting data signal generated by the address conversion tables is coded according to the universal standard code M. For the previous example, the code 3221 (HEX) which represents the Chinese character 打字 will be converted into the address 'ABCD' (HEX).

The terminal 10 is coupled to a base station 30 having an antenna 32 for transmitting and receiving coded data signals.

The ideographical character paging system 2 further comprises a plurality of pagers only one of which 34 is shown.

Figure 2:
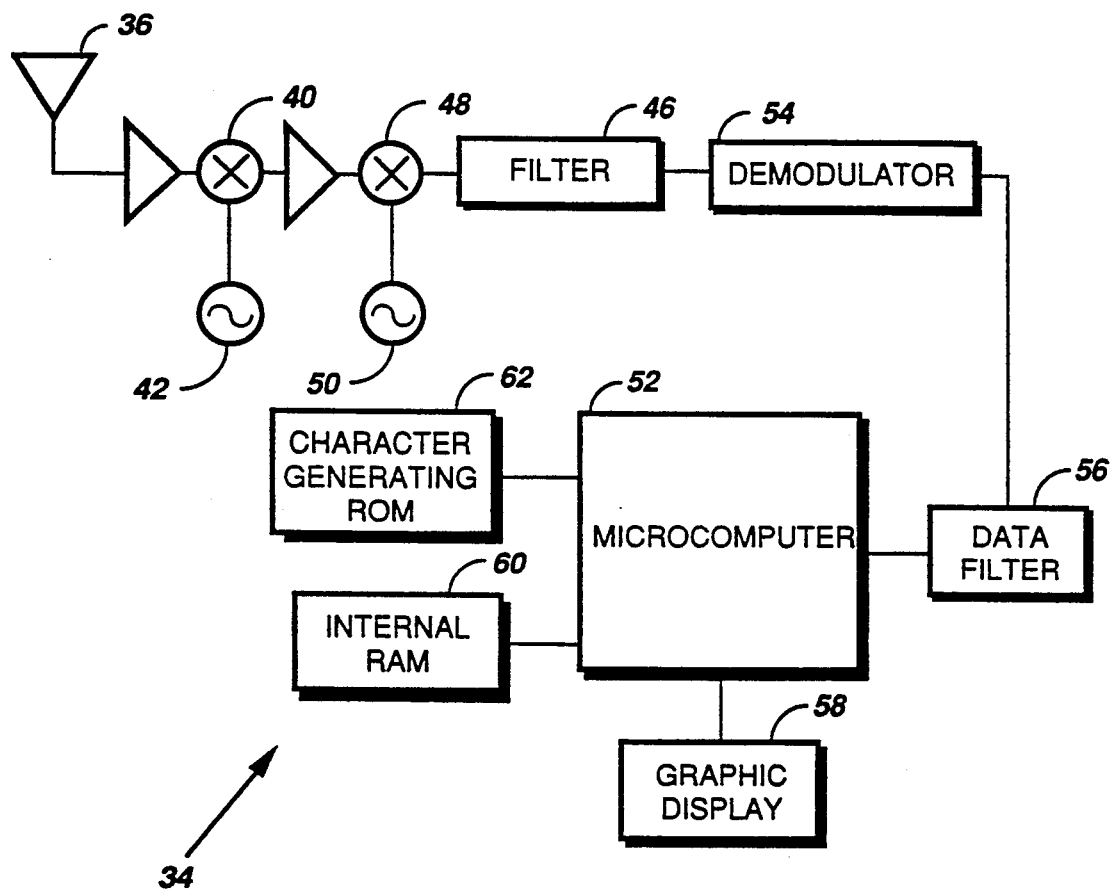
FIG. 2 is a schematic diagram of a display pager which forms part of the ideographical character paging system of FIG. 1.

Referring now also to FIG. 2, the pager 34 comprises an antenna 36 coupled to a first RF amplifier 38 which is coupled to a second RF amplifier 44 via a first mixer 40 connected to a first oscillator 42. The second RF amplifier 44 is coupled to a filter 46 via a second mixer 48 connected to a second oscillator 50. The filter 46 is coupled to a microcomputer 52 via a demodulator 54 and a data filter 56. The microcomputer 52 is coupled to internal Random Access Memory (RAM) 60 and to a graphic display 58 which displays the data signal received at the antenna 36 of the pager 34 once it has been decoded by the microcomputer 52. Such a pager is well known in the art.

In the preferred embodiment of the invention a character generating ROM 62 is also coupled to the microcomputer 52. The character generating ROM 62 stores only the most frequently used characters of the ideographical language (i.e. the 'legal' characters) so as to reduce the size of the memory. For example, 1M bits of ROM can store 4096 characters which is sufficient to cover the 'legal' characters. The character generating ROM 62 is arranged in a 16×16 byte dot matrix pattern.

Figure 3:
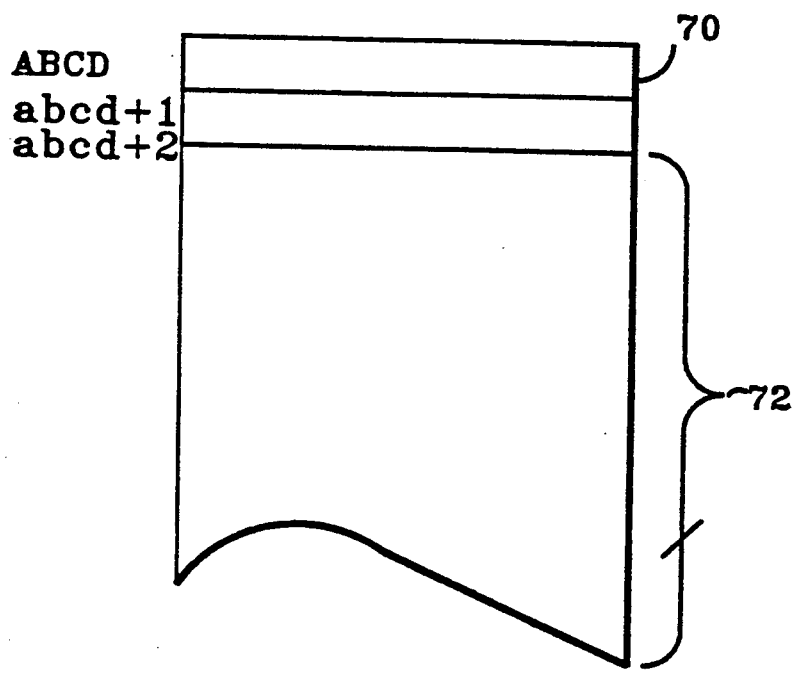
FIG. 3 shows a diagrammatic representation of the address organization of the character generating ROM of the pager of FIG. 2.

The address for each character stored in the character generating ROM 62 is identical to the coding of the same character according to the universal standard code M. FIG. 3 shows the address organization for the location of one character, for example the character 打字, of the plurality of characters in the character generating ROM 62. As has been mentioned above the character 打字 has a code 'ABCD' (HEX) according to the universal standard code M which is therefore the starting address 70 of the character 打字 in the character generating ROM 62. The starting address 'ABCD' (HEX) is followed by 32 bytes of pixel patterns 72 (ABCD1, ABCD2, ABCD3, ABCD4, etc.) which go to make up the character 打字. In operation if the data signal received by the antenna 36 of the pager 34 is decoded and includes the address ABCD, then, under the control of the microcomputer 52, the 32 byte pixel pattern of the character 打字 will be loaded into the internal RAM 60. During a further cycle of the microcomputer 52 the pixel patterns will be outputted to the graphic display 58 in order to display the character 打字.

The ideographical paging system 2 operates in the following manner.

A character is keyed into the PC 12 using the keyboard 18. The PC codes the character by selecting a code for the character from its memory (not shown) according to a particular coding standard. The selected code may be one or two bytes. The coded data signal is then transmitted via the MODEM 24 to the signal code controller 14 of the terminal 10. Before converting the coded word(s) into an address according to the universal standard code M, the signal code controller 14 decodes the word(s) and checks that the character is one of the 'legal' characters stored in the character generating ROM 62 of the pager 34. If a 'legal' character is keyed into the entry device 18, then the signal code controller 14 converts the coded word(s) into an address using the conversion table (not shown). The address data outputted from the signal code controller 14 is used to modulate a carrier signal in the terminal 10.

The modulated signal is transmitted by the antenna 32 to the pager 34. If, however, an 'illegal' character is keyed into the entry device 18 and coded by the PC 12, the signal code controller 14 will detect an 'illegal' character when it attempts to perform the conversion. The terminal 10 will then search in a look-up table (not shown) for a replacement character having the same meaning. If a replacement is found the signal code controller 14 converts the coded word(s) of the replaced character into an address using the conversion table (not shown) and the output address data signal is transmitted by the antenna 32 to the pager 34 as described above. If no replacement character is found then the coded word(s) of the 'illegal' character will be used to modulate the carrier signal which is then transmitted to the pager 34.

A data signal received at the antenna 36 of the pager 34 is decoded. The decoded data word(s) comprise at least one starting address 70 of one character in the character generating ROM 62. Under the control of the microcomputer 52, once a location in the character generating ROM 62 has been addressed the 32 byte pixel pattern of the selected character is loaded into the internal RAM 60. During a further cycle of the microcomputer 52, the pixel patterns will be outputted to the graphic display 58 in order to display the selected character. If an 'illegal' character transmitted from the terminal 10 is decoded, the pager will replace the 'illegal' character by a special symbol from the character generating ROM 62 which will be subsequently displayed on the graphic display 58.

Thus, the user of the pager will be able to determine if the special symbol is displayed, that one character is missing due to the capacity limitation of the character generating ROM rather than a malfunction due to either a hardware or software problem. In addition, since data decoding is not interrupted when the pager receives an 'illegal' character which is subsequently represented on the graphic display by the special symbol, a complete message can be displayed. The complete message displayed will comprise the special symbol and the 'legal' characters and thus, the user should be able to decipher the whole or most of the message.

When characters of a message are entered into the ideographical paging system, the entry system can operate in one of two ways: automatic message entry or manual message entry.

Figure 4:
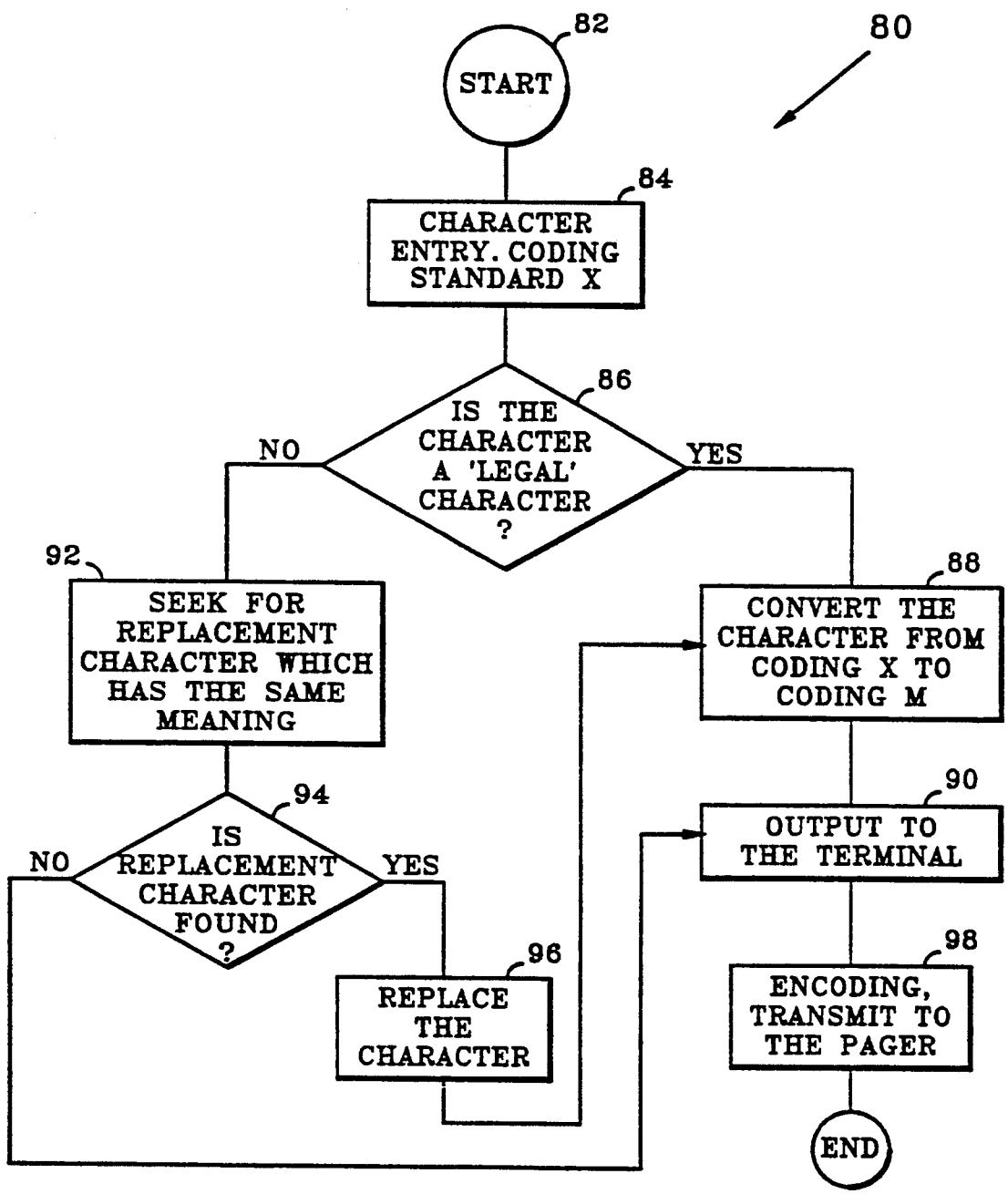
FIG. 4 comprises a detailed flow-chart of one implementation of the preferred embodiment of the invention.

The automatic message entry operation of the entry device 4 and terminal 10 of the ideographical paging system of FIG. 1 is illustrated in the flow-chart 80 of FIG. 4. FIG. 4 is described with respect to one character of the plurality of characters which make up a message. It will be appreciated, however, that the routine is repeated for all the characters of the message.

The automatic message entry operation starts at 82. The character is entered into the entry device 4 and the character is coded according to the coding standard X, block 84. Coding standard X may be any one of the JIS, PRC or Taiwan coding standards. A verification that the character is a 'legal' character is initiated at 86. If the character is found to be 'legal', the routine branches to convert the character from coding standard X to universal coding standard M, at block 88. The character coded according to universal coding standard M is outputted to the terminal 10, at block 90.

If the character is found to be 'illegal', a search is made at block 92 for a replacement character which has the same meaning. If a replacement character is found the 'illegal' character is replaced by the replacement character at 96 which is then converted from coding standard X to universal coding standard M, at block 88. The replacement character coded according to universal coding standard M is outputted to the terminal 10, at block 90. If no replacement character is found the 'illegal' character coded according to standard coding X is outputted to the terminal 10, at block 90.

The coded character outputted to the terminal 10 is encoded and transmitted to the pager 34, at block 98.

Figure 5:
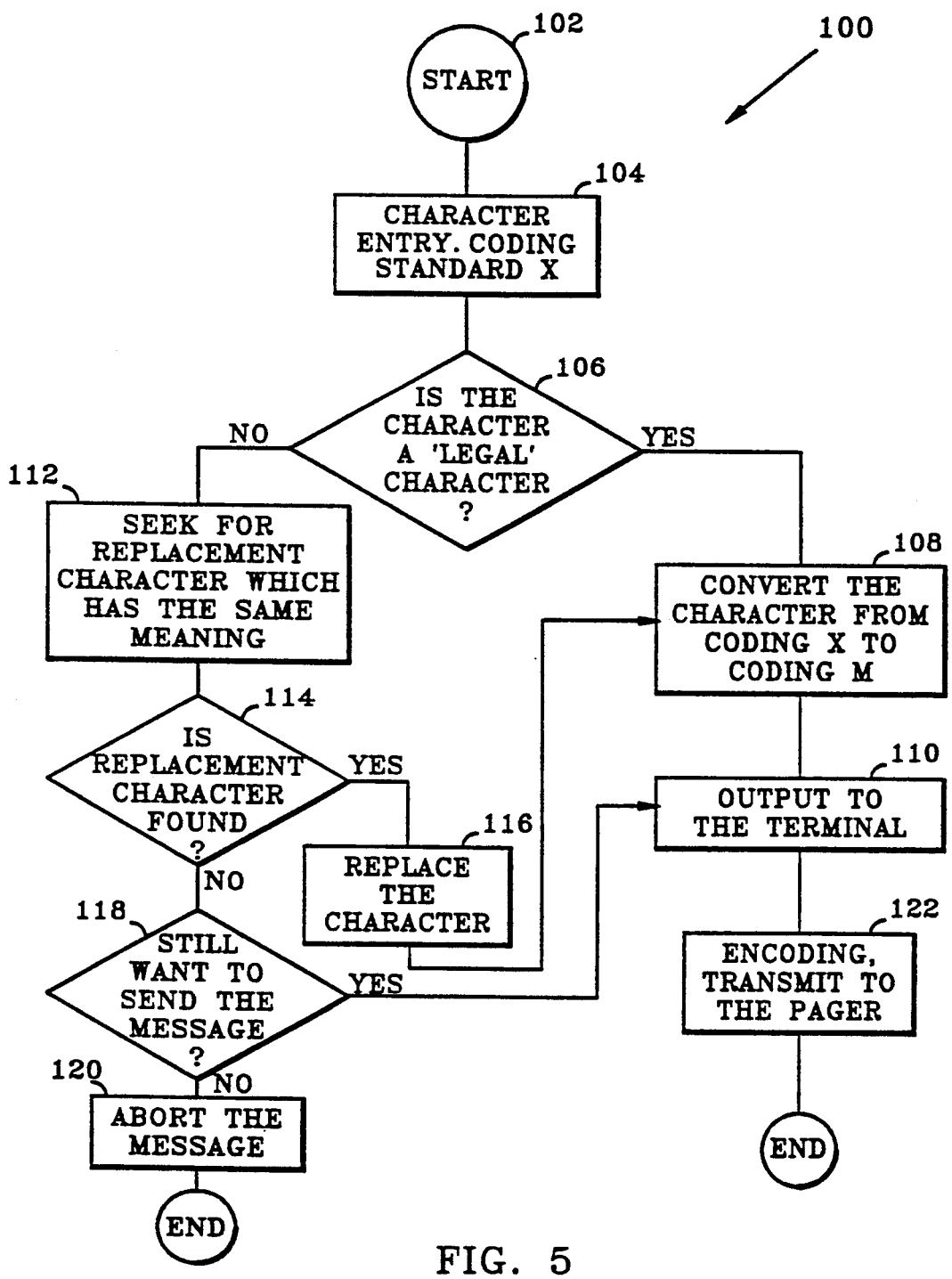
FIG. 5 comprises a detailed flow-chart of a second implementation of the preferred embodiment of the invention.

The manual message entry operation of the entry device 4 and terminal 10 of the ideographical paging system of FIG. 1 is illustrated in the flow-chart 100 of FIG. 5. FIG. 5 is described with respect to one character of the plurality of characters which make up a message.

The manual message entry operation starts at 102. The character is entered into the entry device 4 and the character is coded according to the coding standard X, block 104. A verification that the character is a 'legal' character is initiated at 106. If the character is found to be 'legal' the routine branches to convert the character from coding standard X to universal coding standard M, at block 108. The character coded according to universal coding standard M is outputted to the terminal 10, at block 110.

If the character is found to be 'illegal', a search is made at block 112 for a replacement character which has the same meaning. If a replacement character is found the 'illegal' character is replaced by the replacement character at 116 which is then converted from coding standard X to universal coding standard M at block 108. The replacement character coded according to universal coding standard M is outputted to the terminal 10, at block 110. The operation so far has been identical to that described with reference to FIG. 4.

However, if no replacement character is found, the person who operates the entry device 4 can choose at block 118 whether to send the message or not. If no message is to be sent, the message is aborted at 120. If the message is to be sent, the 'illegal' character coded according to standard coding X is outputted to the terminal 10, at block 110.

The coded character outputted to the terminal 10 is encoded and transmitted to the pager 34, at block 122.

Figure 6:
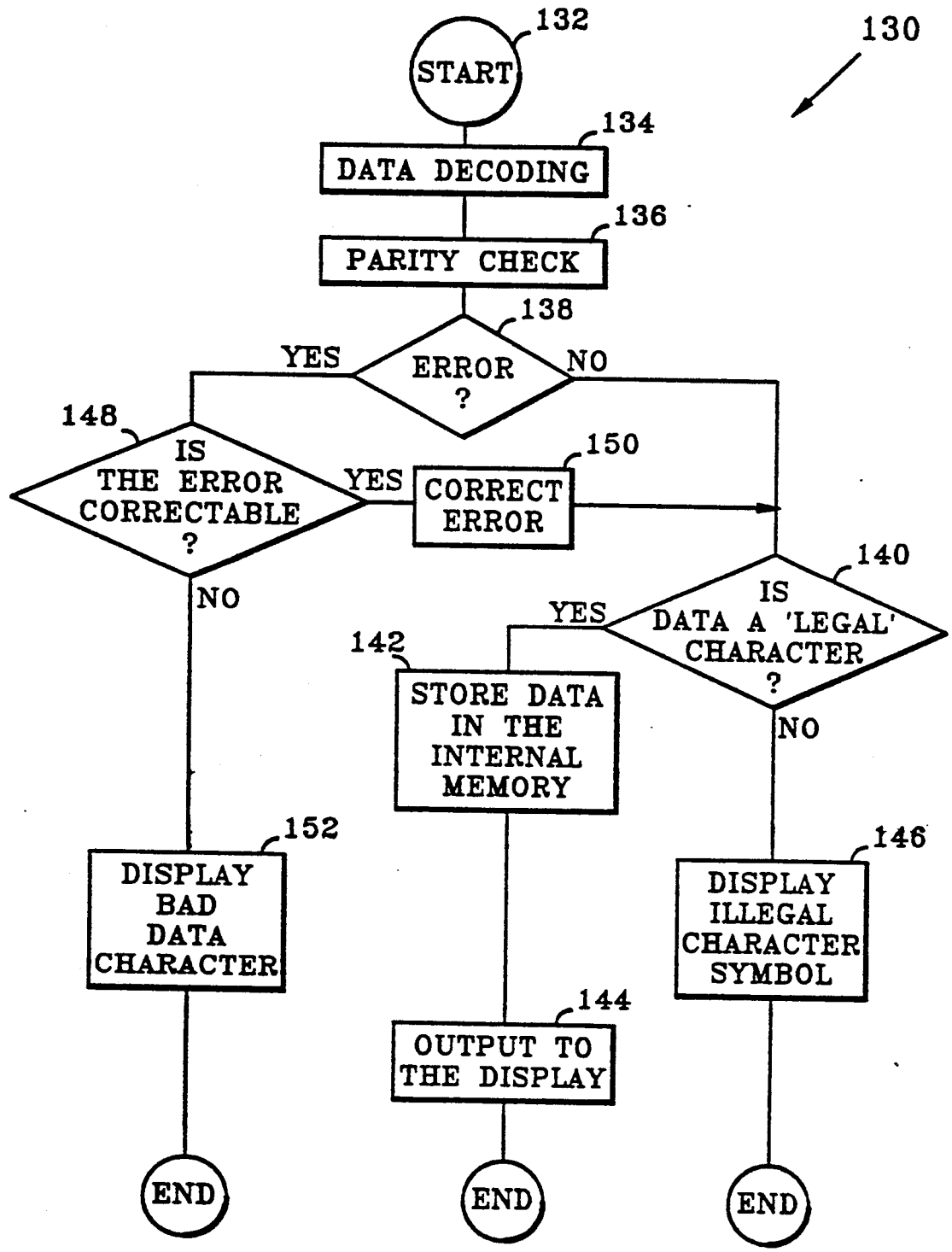
FIG. 6 comprises a detailed flow-chart of an implementation of the display pager in accordance with a second aspect of the present invention.

The operation of the pager 34 of FIG. 2 is illustrated in the flow-chart 130 of FIG. 6.

The operation starts at block 132. The data signal received at the antenna 36 of the pager 34 is decoded, at 34 and a parity check is initiated at 136. If, after completing the parity check, no error in the data is detected the routine branches to determine if the decoded data is a 'legal' character, at 140. If the character is found to be 'legal' the character is read from the character generating ROM 62 into the internal RAM 60 at block 142. The stored character in the RAM 60 is then outputted to the graphic display at block 144. If the character is found to be 'illegal' the 'illegal' character symbol is displayed at the graphic display, block 146.

If, after completing the parity check, an error in the data is detected the routine branches to determine if the error is correctable, block 148. If the error is correctable, the error corrected at block 150, and the data is checked to determine if the corrected data is a legal character, at 140. If the character is found to be 'legal' the character is read from the character generating ROM 62 into the internal RAM 60 at block 142. The stored character in the RAM 60 is then outputted to the graphic display at block 144. If the character is found to be 'illegal' the 'illegal' character symbol is displayed at the graphic display, block 146. If the error cannot be corrected, the bad data character symbol is displayed at the graphic display 58, block 152.

In summary, by converting the coded characters to a universal coding standard in the pager terminal, the preferred embodiment of the first aspect of the present invention allows for one pager model to be used in different areas using different coding standards. In addition, since the preferred embodiment utilizes a character generating ROM which stores only the most frequently used characters the size of the character generating ROM can be reduced.

The preferred embodiment of the second aspect of the present invention enables a complete message to be displayed, including 'illegal' character symbols if a rarely used character is part of the message. Thus, the user of the pager will be able to decipher the whole or most of the message, even if rarely used characters form part of the message.

What is claimed is:

1. An ideographical character paging system comprising:
   input means for inputting characters of a particular ideographical language;
   processing means coupled to the input means for processing each of the ideographical character, said processing means including means for selecting a code for encoding each ideographical character according to a particular coding standard for transmission;
   first transmitter means coupled to the processing means for transmitting the encoded ideographical characters to a terminal controller; said terminal controller, comprising:
   determining means for determining whether each of the encoded ideographical character corresponds to one of a universal character set the determining means further determines whether the encoded ideographical characters not found within the universal character set comprise a replaceable or non-replaceable ideographical character;
   replacement means for replacing each replaceable character as determined by the determining means with a determined replacement character;
   code converting means for converting the encoded ideographical characters found within the universal character set and the replacement characters to a first code; and
   second transmitter means for transmitting said first code and the non-replaceable ideographical characters to a remote location;
   receiver means, at said remote location, for receiving said first code and said non-replaceable ideographical characters; and
   decoding means, coupled to said receiver means, for decoding said first code to produce said ideographical characters encoded therein, said decoding means comprising a replacing means for replacing said non-replaceable ideographical characters with a predetermined character symbol.

2. A selective call receiver for use within an ideographical character signalling system for receiving data signals comprising a plurality of coded ideographical character messages wherein the ideographical character messages including replaceable ideographical characters being code converted according to a first code according to a universal character set and non-replaceable ideographical characters according to said universal character set not being converted, comprising:
   decoding means for decoding each one of a plurality of coded ideographical characters within said plurality of coded ideographical character messages;
   character generating means for generating ideographical characters from the decoded first code for display;
   control means for determining the type of each one of said plurality of ideographical characters within said plurality of coded ideographical character messages, said control means in response to said first type of ideographical character selects the corresponding ideographical character from the character generating means and sad control means in response to a decoded non-replaceable ideographical character selects a predetermined character symbol; and
   display means for displaying the ideographical characters and said predetermined character symbols.

3. A selective call receiver according to claim 2 wherein said character generating means comprises a Read Only Memory.

4. A selective call receiver according to claim 2 wherein said control means comprises a microcomputer.

5. A paging system comprising:
   terminal receiving means for receiving a message comprising a plurality of encoded ideographical characters;
   determining means coupled to the terminal receiving means for determining whether each of the encoded ideographical character corresponds to one of a universal character set, the determining means further determines whether each encoded ideographical character not found within the universal character set comprises a replaceable ideographical character or is a non-replaceable ideographical character according to the universal character set;
   replacement means for replacing each replaceable character as determined by the determining means with a replacement character;
   code converting means for converting the encoded ideographical characters found within the universal character set and the replacement characters to a first code; and
   transmitting means for transmitting said first code and the non-replaceable ideographical characters to at least one selective call receiver at a remote location; the selective call receiver, comprising:
   receiving means for receiving said first code and said non-replaceable characters;
   decoding means, coupled to said receiving means, for decoding said first code to produce the ideographical characters encoded therein, said decoding means comprising a replacing means for replacing the decoded non-replaceable ideographical character with a predetermined character symbol; and
   display means for displaying the decoded ideographical characters and the pre-determined character symbol.

6. A selective call receiver for use within an ideographical character signalling system for receiving data signals comprising a plurality of coded ideographical character messages wherein replaceable ideographical characters being code converted to a first code according to a universal character set and non-replaceable ideographical characters according to said universal character set not being code converted, comprising:

decoder for decoding each one of the plurality of coded ideographical characters within said plurality of coded ideographical character messages;

character generator for generating ideographical characters from the decoded first code for display;

micro-processor controller for determining the type of each one of said plurality of decoded ideographical characters within said plurality of coded ideographical character messages, said micro-processor controller in response to a decoded first code selects the corresponding ideographical character from the character generator and said microprocessor controller in response to decoding a non-replaceable ideographical character selects a predetermined character symbol; and display means for displaying the decoded ideographical characters and said predetermined character symbols.

7. A paging system comprising:

input means for inputting characters of a particular ideographical language;

microprocessor coupled to the input means for processing each of the particular ideographical character, said microprocessor including means for selecting a code for encoding each ideographical character according to a particular coding standard for transmission;

modem coupled to the microprocessor for transmitting the encoded ideographical characters to a terminal controller having a receiver for receiving the encoded ideographical characters; said terminal controller, comprising:

determining means for determining whether each of the encoded ideographical character corresponds to one of a universal character set, the determining means further determines whether each encoded ideographical character not found within the universal character set comprises a replaceable ideographical character or a non-replaceable ideographical character;

replacement means for replacing each replaceable character as determined by the determining means with a replacement character;

code converting means for converting the encoded ideographical characters found within the universal character set and the replacement characters to a first code; and transmitter for transmitting said first code and the non-replaceable ideographical characters to at least one selective call receiver at a remote location; the selective call receiver, comprising:

receiver for receiving said first code and said non-replaceable characters;

decoder, coupled to said receiver, for decoding said first code to generate the ideographical characters encoded therein, said decoder comprising a replacing means for replacing the decoded non-replaceable ideographical character with a predetermined character symbol; and display means for displaying the decoded ideographical characters and the pre-determined character symbol.

* * * * *